US012570034B2

(12) United States Patent
Kindl et al.

(10) Patent No.: US 12,570,034 B2
(45) Date of Patent: Mar. 10, 2026

(54) APPARATUS AND METHOD FOR FORMING PLASTIC PREFORMS INTO PLASTIC CONTAINERS

(71) Applicant: KRONES AG, Neutraubling (DE)

(72) Inventors: Norbert Kindl, Tegernheim (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 171 days.

(21) Appl. No.: 18/231,144

(22) Filed: Aug. 7, 2023

(65) Prior Publication Data

US 2024/0042669 A1 Feb. 8, 2024

(30) Foreign Application Priority Data

Aug. 5, 2022 (DE) ..................... 10 2022 119 694.1

(51) Int. Cl.
B29C 49/28 (2006.01)
B29C 49/36 (2006.01)
(Continued)

(52) U.S. Cl.
CPC ........ B29C 49/28012 (2022.05); B29C 49/36 (2013.01); B29C 49/46 (2013.01); B29C 49/5611 (2022.05); *B29C 2049/4697* (2013.01)

(58) Field of Classification Search
CPC ... B29C 49/46; B29C 49/56; B29C 49/28012; B29C 49/5611; B29C 49/36;
(Continued)

(56) References Cited

U.S. PATENT DOCUMENTS

| | | | |
|---|---|---|---|
| 3,469,893 A | 9/1969 | Hudson | ................... F16C 17/00 |
| 8,632,325 B2 | 1/2014 | Voth et al. | .............. B29C 49/12 |

(Continued)

FOREIGN PATENT DOCUMENTS

| | | | | |
|---|---|---|---|---|
| DE | 102010022128 | 11/2011 | ............ | B29C 49/46 |
| DE | 202013104120 | 9/2013 | ............ | B29C 49/36 |

(Continued)

OTHER PUBLICATIONS

German Search Report issued in German Patent Appln. No. 10 2022 119 694.1, dated Feb. 28, 2023, with machine English translation, 8 pages.

(Continued)

*Primary Examiner* — Monica A Huson
(74) *Attorney, Agent, or Firm* — HAYES SOLOWAY P.C.

(57) ABSTRACT

Disclosed is an apparatus for forming plastic preforms into plastic containers, having a blow molding device with at least two blow mold side parts and a base part movable in a longitudinal direction of the plastic container, wherein the blow mold side parts and the base part form a cavity, within which the plastic preforms can be formed into the plastic containers through exposure to a flowable medium. The apparatus has a movable carrier on which a plurality of blow molding devices are arranged, and the blow mold side parts are arranged respectively on a first mold carrier and a second mold carrier, which are movable with respect to a main shaft that is stationary relative to the carrier for opening and/or closing. An opening and/or closing movement of the first mold carrier takes place by a first angle, and an opening and/or closing movement of the second mold carrier takes place by a second angle, wherein the first angle and the second angle are substantially identical.

17 Claims, 2 Drawing Sheets

(51)  Int. Cl.
  B29C 49/46     (2006.01)
  B29C 49/56     (2006.01)

(58)  Field of Classification Search
  CPC ...... B29C 49/42405; B29C 2049/4697; B29C
          49/12; B29C 49/5602; B29C 2049/4858;
          B29C 2049/4892; B29C 49/06; B29L
                                              2031/7158
  See application file for complete search history.

(56)                  References Cited

U.S. PATENT DOCUMENTS

| | | | | |
|---|---|---|---|---|
| 9,050,749 | B1 | 6/2015 | Yang et al. | ............. B29C 49/36 |
| 2014/0151940 | A1 | 6/2014 | Pillipp et al. | ........... B29C 49/56 |

FOREIGN PATENT DOCUMENTS

| | | | | |
|---|---|---|---|---|
| EP | 2435235 | 4/2013 | ............. | B29C 49/56 |
| EP | 3200968 | 2/2020 | ............. | B29C 49/48 |

OTHER PUBLICATIONS

European Search Report issued in Patent Appln. No. 23175643.8, dated Dec. 6, 2023, with machine English translation, 9 pages.

APPARATUS AND METHOD FOR FORMING PLASTIC PREFORMS INTO PLASTIC CONTAINERS

BACKGROUND OF THE INVENTION

The present invention relates to an apparatus and a method for forming plastic preforms into plastic containers. Such apparatuses and methods have long been known from the prior art. The plastic preforms are usually formed into the plastic containers within a blow molding device by exposure to a flowable medium. The blow molding devices usually have two blow mold side parts and a base part, which together form a hollow space which corresponds to a negative contour of the finished plastic container. In recent times, apparatuses and methods have also become known with which the formation of the plastic preforms into the plastic containers takes place within a clean room. In this way, it is possible, for example, for the entire forming process already to be carried out under sterile conditions, and subsequently the manufactured plastic containers therefore do not have to be sterilized again or only with less effort. So-called blow molding machines are also known from the prior art which, during the blowing process, also stretch the plastic preforms in their longitudinal direction. These are in particular so-called stretch blow molding machines.

To feed the plastic preforms into the blow molding device and to remove the finished plastic containers from the blow molding device again, the blow molding devices are opened and closed. In order to carry out movements such as opening and closing the blow molding device, lifting the base part on and off, inserting the application device and the stretch rod into the plastic container, etc., the applicant's internal prior art provides several guide curves with corresponding guide rollers, by means of which such movements are controlled.

It is known from the applicant's internal prior art that, in a certain series or range of an apparatus for forming plastic preforms into plastic containers, the guide curves are arranged outside the clean room, which significantly reduces the size of the clean room. At the same time, however, the clean room must be large enough for the opening movement of the blow molding device. This is realized by a movable shaft on which the blow molding device or its side parts and mold carriers are mounted, such that one blow mold side part is designed to be movable for opening and closing the blow molding device, and the other blow mold side part is designed to be immovable. Therefore, a large part of the interior space of the clean room remains unused.

Furthermore, this arrangement also leads to a clear conceptual difference from other series or ranges of apparatuses known from the applicant's internal prior art for forming plastic preforms into plastic containers, and thus to low synergy effects and higher costs.

The present invention is therefore based upon the object of designing such apparatuses and methods in a more flexible and cost-effective manner. According to the invention, the object is achieved by the subject matter of the independent claims. Advantageous embodiments and developments are the subject matter of the dependent claims.

SUMMARY OF THE INVENTION

The invention is therefore directed at an apparatus for forming plastic preforms into plastic containers, wherein the apparatus has a movable carrier on which a plurality of blow molding devices are arranged, wherein at least one of such blow molding devices and preferably each of such blow molding devices has at least two blow mold side parts and a base part movable in a longitudinal direction of the plastic container, wherein the blow mold side parts and the base part form a cavity, within which the plastic preforms can be formed into the plastic containers through exposure to a flowable medium, and the blow mold side parts are arranged respectively on a first mold carrier and a second mold carrier, which are movable with respect to a main shaft that is stationary relative to the carrier for opening and/or closing, and the apparatus is arranged within a clean room.

According to the invention, an opening and/or closing movement of the first mold carrier takes place by a first angle, and an opening and/or closing movement of the second mold carrier takes place by a second angle, wherein the first angle and the second angle are substantially identical.

Accordingly, instead of a movable shaft, it is proposed according to the invention to provide a shaft that is stationary or fixed in relation to the carrier and to design the opening movement accordingly in such a way that both mold carriers perform an opening or closing movement. In addition, as will be explained in more detail below, the guide curves are also partly arranged inside the clean room, in order to make better use of the unused spaces of the clean room.

The device according to the invention also has the advantages of saving upon costs and standardizing the apparatuses for forming plastic preforms into plastic containers by means of the modular principle.

Preferably, the two mold carriers perform an identical movement, instead of one mold carrier being designed to be stationary. This is particularly advantageous because less space is required for the opening movement as a result. The main shaft, with respect to which the mold carriers can be moved and on which the mold carriers are mounted, is preferably arranged inside the clean room. The main shaft preferably connects both mold carriers (mechanically) to one another. Advantageously, both mold carriers rotate relative to a stationary bearing axis of the main axis by basically the same angle. Bearing elements in the form of sealed rolling bearings or plain bearings, which have a significantly reduced coefficient of friction compared with metallic friction, are preferably arranged between the bearing axis and the mold carriers.

Particularly preferably, the opening and closing movement of the mold carriers is mirrored about a geometric axis of symmetry. The opening and closing movement of the mold carriers is preferably a pivoting movement and in particular a pivoting movement by a predetermined angle.

The movement of the mold carriers is preferably controlled by at least one guide curve, which is preferably arranged inside the clean room. The opening of the mold carriers preferably serves in particular for inserting a plastic preform into the blow molding device and, after forming, for allowing a formed plastic container to be removed from the blow molding device. It is also necessary to open the mold carriers to replace the blow mold parts, such as the blow mold side parts and the base part. The opening and closing of the mold carriers is therefore preferably carried out in specific or predetermined angular ranges of the movable carrier, wherein the respective guide curve is also arranged accordingly in this range.

In this context, the fact that the opening and/or closing movement of the first mold carrier by a first angle and the opening and/or closing movement of the second mold carrier by a second angle are substantially identical means, characterized in that the opening and/or closing movement of the first mold carrier by the first angle and the opening and/or closing movement of the second mold carrier by the second angle do not deviate from one another by more than 3°-10°, preferably by no more than 2°-7°, and particularly preferably by no more than 1°-5°. The opening angle between the two mold carriers is preferably between 0 and 150 degrees.

The apparatus for forming plastic preforms into plastic containers is preferably a blow molding machine with at least one blow molding device or blow station. This means that the plastic preforms are first thermally conditioned in a heating section and subsequently expanded by applying a liquid or gaseous medium. The flowable medium is preferably under pressure. For supplying the pressurized medium, the device has a blowing nozzle, which can be sealingly applied to an aperture of the plastic preforms in order to thus expand the plastic preforms with a liquid or gaseous medium. Alternatively or additionally, it would also be possible for the blowing nozzle to seal against a support ring of the plastic preform or blow mold.

In addition, a valve arrangement is preferably also provided which controls the supply of the blowing air to the plastic preforms. Alternatively, however, it is also conceivable that the expansion of the container take place by means of the product, such that simultaneous filling and expansion of the container is performed.

The blow molding machine is preferably a stretch blow molding machine, which means that the preforms are stretched in the longitudinal direction before and/or during expansion by means of a stretch rod. The blow molding devices each have stretch rods, which can be inserted into the plastic preforms and expand the plastic preforms in their longitudinal direction. The stretch rods preferably have an electric drive. However, it is also conceivable to control the stretch rods via curves.

In an advantageous embodiment, a plurality of blow molding devices are arranged on the (common) movable carrier. This carrier is in particular a rotatable carrier. The blow molding device or, more precisely, the mold carriers also have a locking mechanism to lock the mold carrier halves against one another during the blowing process.

The blow molding devices are preferably transported inside the clean room. The clean room is preferably bounded by several walls. Preferably, the clean room is bounded by at least one standing wall and a wall that moves relative to this standing wall. The clean room separates the blow molds in particular from a non-sterile environment. Advantageously, the clean room is designed in the manner of a ring or torus around the blow molding devices or forming stations and/or the transport path of the plastic containers.

In a preferred embodiment, a bearing device for moving the base part is arranged inside the clean room. Preferably, a bearing device for the movement of the base part or for the base lifting movement runs (substantially) parallel to the longitudinal direction or longitudinal axis of the plastic container.

The longitudinal direction is in particular a direction along a central axis of the plastic container. The central axis of the plastic container extends in particular (centrally) through the opening of the container aperture and also in particular centrally through a base region of the container, in particular through an injection point. In the upright position of the container, the central axis extends in particular parallel to a vertical direction. An upright position of the container means that the container stands on its base region, which is therefore closer to the center of the earth than the aperture region of the container. Therefore, "viewed in the longitudinal direction" is also understood to mean a position of the container in which the container is arranged to be upright.

By arranging some parts or devices inside the clean room, the available space inside the clean room is optimally utilized. Since the bearing device is located inside the clean room, it preferably has a grease-free linear guide so as not to contaminate the clean room.

In a further preferred embodiment, the bearing device for the movement of the base part or the base lifting movement is a bearing cage and, in particular, a ball cage. The ball cage is preferably made of plastic materials or a metal, or has such a coating.

For opening and closing the mold carriers, a mold carrier control, such as a guide curve, is preferably provided. The mold carrier control (coupling) preferably has a disengaging element, which is preferably arranged outside the clean room. Preferably, the shaft (main shaft) of the mold carrier control penetrates the clean room, but is not connected to the mold carrier in a stationary manner.

In a preferred embodiment, the device has a mechanical coupling device, which is suitable and intended for coupling the base part movement and the opening and/or closing movement of the first mold carrier and/or the second mold carrier to one another. The coupling can preferably be realized, for example, via a further (coupling) guide curve. Preferably, the base lifting movement is mechanically coupled to the mold carrier opening and closing movement. Thus, when the mold carrier is opened or closed, the base part is also automatically raised or lowered at the same time.

In a preferred embodiment, the device has a kinematic coupling device, which is suitable and intended for coupling the first mold carrier and the second mold carrier to one another, wherein such kinematic coupling device is preferably arranged inside the clean room.

The kinematic coupling is a motion coupling, such that a movement of one mold carrier causes the other mold carrier to move as well.

In another preferred embodiment, the device has a plurality of guide curves selected from a group of guide curves including a locking curve, a base lifting curve, a main guide curve, a blowing nozzle curve, a guide curve for the opening and closing movement of the mold carrier, and the like.

Particularly preferably, the locking curve and/or the base lifting curve and/or the guide curve for the opening and closing movement of the mold carriers are arranged inside the clean room. The additional arrangement of certain guide curves inside the clean room, rather than outside, results in the optimal use of the space of the clean room.

Preferably, the respective associated guide rollers of the locking curve and/or the base lifting curve and/or the guide curve for the opening and closing movement of the mold carriers and the like are also arranged inside the clean room. Both the locking curve and the base lifting curve are arranged below the container base in relation to the longitudinal direction of the plastic container.

The locking curve and the associated locking roller are preferably used to lock the mold carriers in the closed state during the blow molding process. The locking curve is designed to be continuous and preferably extends substantially over the entire circumferential direction below the carrier, such that the mold carriers are held in a locked state throughout the entire blow molding process.

The locking roller is preferably arranged inside the clean room and is preferably directly kinematically coupled to a locking element of the locking device for locking the mold carriers. Since the locking curve and/or the base lifting curve and/or the guide curve for the opening and closing movement of the mold carriers are located inside the clean room, they are preferably sterilized as well when the clean room is sterilized.

The locking device preferably has a movable locking flap and a counterpart to such locking flap, wherein the counterpart of the movable locking flap preferably describes the same movement sequence as the mold carrier, and is thus connected to the mold carrier in a stationary manner.

In another preferred embodiment, the main guide curve and/or the blowing nozzle curve are arranged outside the clean room. The blowing nozzle curve preferably causes the blowing nozzle to move towards the preform and, accordingly, away from the preform.

Preferably, the guide rollers and the like associated with the main guide curve and/or the blowing nozzle curve are located outside the clean room.

The present invention is further directed at a method for operating a device for forming plastic preforms into plastic containers, wherein the device has in particular a movable and in particular rotatable carrier (2), on which a plurality of blow molding devices (6) are arranged, wherein at least one of such blow molding devices and preferably such blow molding devices have at least two blow mold side parts and a base part that can be moved in a longitudinal direction of the plastic container, wherein the blow mold side parts and the base part form a cavity, within which the plastic preforms are exposed to a flowable medium and are formed into the plastic containers, and the blow mold side parts are arranged respectively on a first mold carrier and a second mold carrier, which are moved with respect to a main shaft that is stationary relative to the carrier for opening and/or closing, and the apparatus is arranged within a clean room.

According to the invention, the first mold carrier is opened and/or closed by a first angle, and the second mold carrier is opened and/or closed by a second angle, wherein the first angle and the second angle are substantially identical.

In this case, the above-described device is in particular designed and provided for carrying out this described method, i.e., all listed features of the above-described apparatus are also disclosed for the method described here, and vice versa.

Further advantages and embodiments result from the accompanying drawings.

BRIEF DESCRIPTION OF THE INVENTION

DETAILED DESCRIPTION OF THE DRAWINGS

Figure 1:
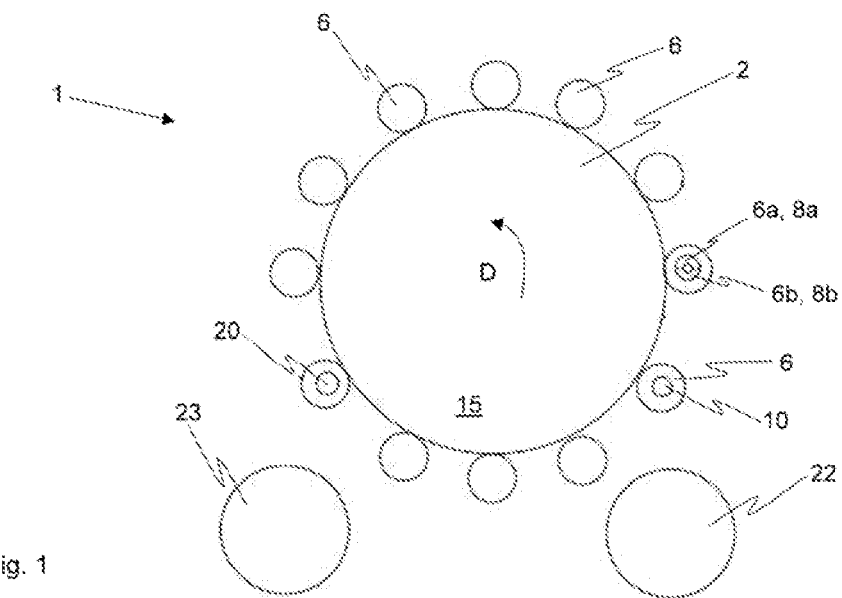
FIG. 1 shows a schematic representation of an apparatus according to the invention.

FIG. 1 shows a schematic representation of an apparatus 1 according to the invention for shaping plastic preforms 10 into plastic containers 20. Thereby, the plastic preforms 10 are fed to the apparatus 1 via a supply device, such as a supply starwheel 22, and the finished plastic containers 20 are again discharged from the apparatus 1 via a discharge device, such as a discharge starwheel 23. The apparatus 1 has a rotatable carrier 2 on which a plurality of blow molding devices 6 are arranged. Thereby, each blow molding device 6 has two blow mold side parts 6a, 6b and a first mold carrier 8a and a second mold carrier 8b, on which the side parts 6a, 6b are arranged. The reference sign 15 indicates a clean room 15, and the reference sign D indicates the direction of rotation of the apparatus 1.

Figure 2:
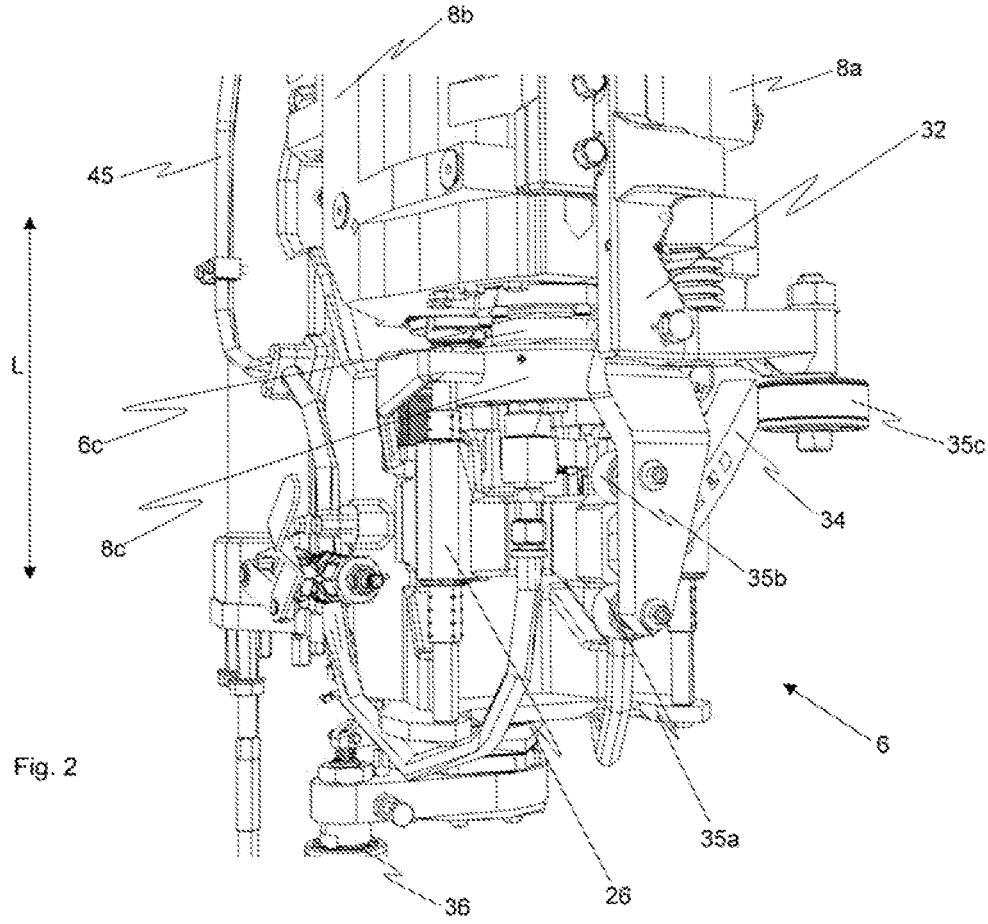
FIG. 2 shows a schematic representation of a blow molding device according to the invention.

FIG. 2 shows a schematic representation of a blow molding device 6 according to the invention. Here, the blow molding device has two blow mold side parts (not shown) along with a base part 6c. Thereby, the blow mold side parts are on mold carriers 8a, 8b, and the base part 6c is on a base part carrier 8c.

The reference sign 32 indicates the locking device for locking the mold carriers 8a, 8b. Thereby, the locking device is actuated by the locking roller 35c, in order to firmly close the mold carriers 8a, 8b—in particular, during the blow molding process.

To open and close the blow molding device 6, the base part carrier 8c is also lowered with the base part 6c. For this purpose, a guide curve 34 is provided, which cooperates with a base lifting roller 35a and 35b to enable the lifting movement of the base part 6c. Thereby, the guide curve 34 is preferably firmly connected to one of the two mold carriers. The base lifting control is supported by a bearing cage 26 such as, in particular, a ball cage. Preferably, the roller 36 cooperates with a curve (not shown) in order to open and/or close the mold carriers.

The reference sign 45 indicates media lines for supplying the blow molding device 6 with flowable media, such as compressed air or cooling liquid. The reference sign L indicates the longitudinal direction L of the blow molding device 6 and also of the plastic containers.

Figure 3:
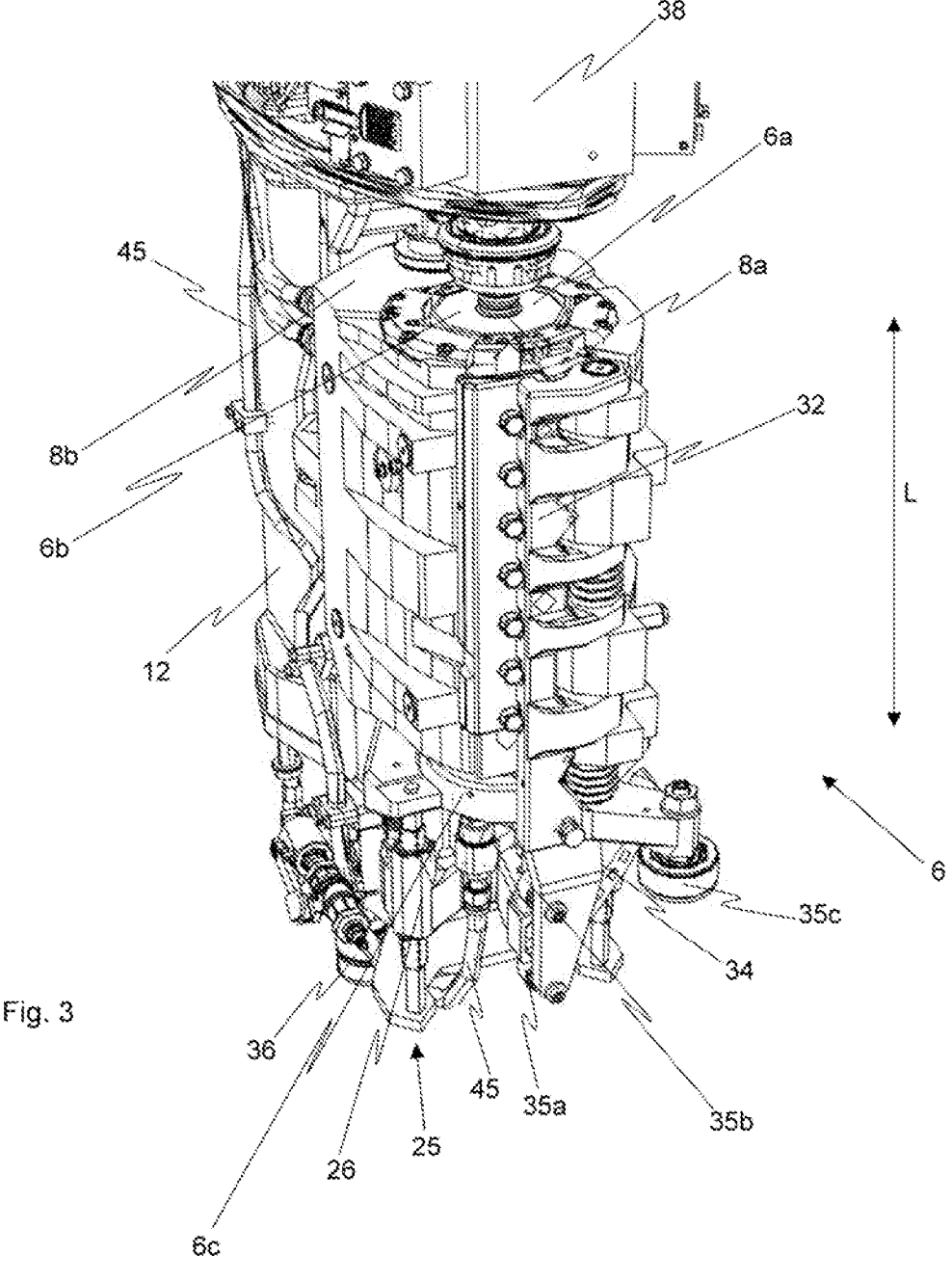
FIG. 3 shows a further schematic representation of a blow molding device according to the invention.

FIG. 3 shows a further schematic representation of a blow molding device 1 according to the invention. In this representation, the two blow mold side parts 6a, 6b of the blow molding device 6 can also be seen, which are arranged on the mold carriers 8a, 8b, along with the base part 6c. The blow molding device 6 or, more precisely, the mold carriers 8a, 8b are mounted on a stationary main shaft 12, wherein the mold carriers 8a, 8b are movable relative to the main shaft 12. The reference sign 25 refers to the bearing device of the base lifting movement, such as a bearing cage 26.

The reference sign 38 indicates a valve unit through which a stretch unit, not shown, is passed.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS

1 Device
2 Carrier
6 Blow molding device
6a, 6b Blow mold side parts
6c Base part
8a First mold carrier
8b Second mold carrier
8c Base part carrier
10 Plastic preform
12 Main shaft 15 Clean room
20 Plastic container
22 Supply starwheel
23 Discharge starwheel
25 Bearing device
26 Bearing cage
32 Locking device
34 Locking curve
35a, 35b, 35c Locking rollers
36 Base lifting roller
38 Stretch unit
45 Media lines
D Direction of rotation
L Longitudinal direction

The invention claimed is:

1. An apparatus for forming plastic preforms into plastic containers, having a movable carrier on which a plurality of blow molding devices are arranged, wherein the blow molding device has at least two blow mold side parts and a base part movable in a longitudinal direction of the plastic container, wherein the blow mold side parts and the base part form a cavity, within which the plastic preforms can be formed into the plastic containers through exposure to a flowable medium, wherein the blow mold side parts are arranged respectively on a first mold carrier and a second mold carrier, which are movable with respect to a main shaft that is stationary relative to the carrier for opening and/or closing, and the device is arranged within a clean room,
  wherein
  an opening and/or closing movement of the first mold carrier takes place by a first angle, and an opening and/or closing movement of the second mold carrier takes place by a second angle, wherein the first angle and the second angle are substantially identical, and
  wherein the apparatus has a plurality of mechanical guide curves selected from a group of guide curves including a locking curve, a base lifting curve, a main guide curve, a blowing nozzle curve, and a guide curve for the opening and closing movement of the mold carrier, wherein the locking curve and/or the base lifting curve and/or the guide curve for the opening and closing movement of the mold carriers are arranged inside the clean room and the main guide curve and/or the blowing nozzle curve are arranged outside the clean room.

2. The apparatus according to claim 1,
  wherein
  a bearing device for the movement of the base part is arranged inside the clean room.

3. The apparatus according to claim 1,
  wherein
  a bearing device for the movement of the base part runs parallel to the longitudinal direction of the plastic container.

4. The apparatus according to claim 2,
  wherein
  the bearing device for the movement of the base part is a bearing cage.

5. The apparatus according to claim 1,
  wherein
  the apparatus has a mechanical coupling device, which is configured for coupling the base part movement and the opening and/or closing movement of the first mold carrier and/or second mold carrier to one another.

6. The apparatus according to claim 1,
  wherein
  the apparatus has a kinematic coupling device, which is configured for coupling the first mold carrier and the second mold carrier to one another, wherein such kinematic coupling device is arranged inside the clean room.

7. A method for operating an apparatus for forming plastic preforms into plastic containers, having a movable carrier on which a plurality of blow molding devices are arranged, having a blow molding device with at least two blow mold side parts and a base part, which can be moved and/or is moved in a longitudinal direction of the plastic container, wherein the blow mold side parts and the base part form a cavity, within which the plastic preforms are exposed to a flowable medium and are formed into the plastic containers, wherein the blow mold side parts are arranged respectively on a first mold carrier and a second mold carrier, which are moved with respect to a main shaft that is stationary relative to the carrier for opening and/or closing, and the apparatus is arranged within a clean room,
  wherein
  the first mold carrier is opened and/or closed by a first angle, and the second mold carrier is opened and/or closed by a second angle, wherein the first angle and the second angle are substantially identical, and
  wherein a plurality of mechanical guide curves selected from a group of guide curves including a locking curve, a base lifting curve, a main guide curve, a blowing nozzle curve, and a guide curve for the opening and closing movement of the mold carrier are provided, wherein the locking curve and/or the base lifting curve and/or the guide curve for the opening and closing movement of the mold carriers are arranged inside the clean room and the main guide curve and/or the blowing nozzle curve are arranged outside the clean room.

8. The apparatus according to claim 3,
  wherein
  the bearing device for the movement of the base part is a bearing cage.

9. The apparatus according to claim 3,
  wherein
  the apparatus has a mechanical coupling device, which is configured for coupling the base part movement and the opening and/or closing movement of the first mold carrier and/or second mold carrier to one another.

10. The apparatus according to claim 3,
  wherein
  the apparatus has a kinematic coupling device, which is configured for coupling the first mold carrier and the second mold carrier to one another, wherein such kinematic coupling device is arranged inside the clean room.

11. An apparatus for forming plastic preforms into plastic containers, having a movable carrier on which a plurality of blow molding devices are arranged, wherein the blow molding device has at least two blow mold side parts and a base part movable in a longitudinal direction of the plastic container, wherein the blow mold side parts and the base part form a cavity, within which the plastic preforms can be formed into the plastic containers through exposure to a flowable medium, wherein the blow mold side parts are arranged respectively on a first mold carrier and a second mold carrier, which are movable with respect to a main shaft that is stationary relative to the carrier for opening and/or closing, and the device is arranged within a clean room,
  wherein
  an opening and/or closing movement of the first mold carrier takes place by a first angle, and an opening and/or closing movement of the second mold carrier takes place by a second angle, wherein the first angle and the second angle are substantially identical, wherein a bearing device for the movement of the base part is arranged inside the clean room, and wherein the bearing device for the movement of the base part is a bearing cage.

12. The apparatus according to claim 11, wherein a bearing device for the movement of the base part runs parallel to the longitudinal direction of the plastic container.

13. The apparatus according to claim 11, wherein the apparatus has a mechanical coupling device, which is configured for coupling the base part movement and the opening and/or closing movement of the first mold carrier and/or second mold carrier to one another.

14. The apparatus according to claim 11, wherein the apparatus has a kinematic coupling device, which is configured for coupling the first mold carrier and the second mold carrier to one another, wherein such kinematic coupling device is arranged inside the clean room.

15. An apparatus for forming plastic preforms into plastic containers, having a movable carrier on which a plurality of blow molding devices are arranged, wherein the blow molding device has at least two blow mold side parts and a base part movable in a longitudinal direction of the plastic container, wherein the blow mold side parts and the base part form a cavity, within which the plastic preforms can be formed into the plastic containers through exposure to a flowable medium, wherein the blow mold side parts are arranged respectively on a first mold carrier and a second mold carrier, which are movable with respect to a main shaft that is stationary relative to the carrier for opening and/or closing, and the device is arranged within a clean room, wherein an opening and/or closing movement of the first mold carrier takes place by a first angle, and an opening and/or closing movement of the second mold carrier takes place by a second angle, wherein the first angle and the second angle are substantially identical, and wherein the bearing device for the movement of the base part is a bearing cage.

16. The apparatus according to claim 15, wherein the apparatus has a mechanical coupling device, which is configured for coupling the base part movement and the opening and/or closing movement of the first mold carrier and/or second mold carrier to one another.

17. The apparatus according to claim 15, wherein the apparatus has a kinematic coupling device, which is configured for coupling the first mold carrier and the second mold carrier to one another, wherein such kinematic coupling device is arranged inside the clean room.

* * * * *